United States Patent
Wu et al.

(10) Patent No.: US 9,813,915 B2
(45) Date of Patent: Nov. 7, 2017

(54) BASE STATION AND USER TERMINAL IN SPECTRUM SHARING SYSTEM AND METHOD FOR DETERMINING USAGE OF SHARED SPECTRUM

(71) Applicant: Institute For Information Industry, Taipei (TW)

(72) Inventors: Chih-Chiang Wu, Taichung (TW); Chiu-Wen Chen, Taipei (TW); Chun-Che Chien, Taipei (TW)

(73) Assignee: Institute For Information Industry, Taipei (TW)

(*) Notice: Subject to any disclaimer, the term of this patent is extended or adjusted under 35 U.S.C. 154(b) by 0 days.

(21) Appl. No.: 15/204,878

(22) Filed: Jul. 7, 2016

(65) Prior Publication Data
US 2017/0013471 A1    Jan. 12, 2017

Related U.S. Application Data

(60) Provisional application No. 62/189,206, filed on Jul. 7, 2015.

(51) Int. Cl.
*H04W 72/00* (2009.01)
*H04W 16/14* (2009.01)
*H04W 24/10* (2009.01)

(52) U.S. Cl.
CPC ......... *H04W 16/14* (2013.01); *H04W 24/10* (2013.01)

(58) Field of Classification Search
CPC ..... H04W 16/14; H04W 24/10; H04W 24/08; H04W 72/082; H04W 72/0453;
(Continued)

(56) References Cited

U.S. PATENT DOCUMENTS

| 2009/0017440 A1 | 1/2009 | Pribenszky et al. |
| 2009/0170440 A1* | 7/2009 | Eyuboglu ............. H04W 36/06 455/63.3 |
| 2015/0280847 A1* | 10/2015 | Somasundaram ... H04J 11/0056 370/252 |

FOREIGN PATENT DOCUMENTS

| EP | 2373077 A1 | 10/2011 |
| WO | 2009050212 A1 | 4/2009 |

OTHER PUBLICATIONS

Office Action to the corresponding Taiwan Patent Application rendered by the Taiwan Intellectual Property Office (TIPO) dated Jul. 13, 2017, 25 pages (including English translation of summary of Office Action).

* cited by examiner

*Primary Examiner* — Idowu O Osifade
(74) *Attorney, Agent, or Firm* — Skaar Ulbrich Macari, P.A.

(57) ABSTRACT

A base station in a spectrum sharing system includes a sensor configured to sense signals over a shared spectrum, a transceiver configured to receive at least one measurement report transmitted from at least one user terminal regarding signals over the shared spectrum sensed by the at least one user terminal and a processor configured to determine whether to utilize the shared spectrum according to the signals over the shared spectrum sensed by the sensor or acquired from the at least one measurement report. A user terminal in a spectrum sharing system includes a sensor configured to sense signals over a shared spectrum, a processor configured to generate a measurement report regarding the signals over the shared spectrum and a transceiver configured to transmit the measurement report to a base station so that the base station determines whether to utilize (Continued)

the shared spectrum according the signals over the shared spectrum.

14 Claims, 9 Drawing Sheets

(58) Field of Classification Search
CPC ..... H04W 28/08; H04W 72/04; H04W 16/10; H04W 72/085; H04W 72/0486; H04W 4/008; H04W 76/023; H04W 16/06; H04W 72/0413; H04W 72/042
See application file for complete search history.

BASE STATION AND USER TERMINAL IN SPECTRUM SHARING SYSTEM AND METHOD FOR DETERMINING USAGE OF SHARED SPECTRUM

PRIORITY

This application claims priority to U.S. Provisional Patent Application No. 62/189,206 filed on Jul. 7, 2015, which is incorporated herein by reference in its entirety.

FIELD

Aspects of the present disclosure are related generally to a spectrum sharing system, and more particularly, to a base station, a user terminal and a method for determining usage of a shared spectrum in the spectrum sharing system.

BACKGROUND

Mobile broadband usage continues to grow rapidly throughout the world. This dramatic growth has placed pressure on Mobile Network Operators (MNOs) to ensure adequate capacity and performance, and on regulators to provide access to the additional spectrum critical to capacity expansion.

Spectrum, a highly essential resource for wireless communications, is a finite resource that is in high demand due to the dramatic growth in wireless mobile data traffic. From license perspective, spectrum utilized in the wireless communication field may be divided into: licensed spectrum for commercial services which is exclusive, high quality yet costly; and unlicensed spectrum which is not exclusive and low cost. Under the definition, spectrum sharing is the collective use of a given portion, i.e., frequency band, of the licensed spectrum or the unlicensed spectrum by two or more parties.

As considering spectrum sharing, there must be interference among the parties due to the collective use of spectrum, whether the spectrum sharing is applied to the licensed spectrum or the unlicensed spectrum. It is undesired that the interference among the parties is serious enough for destroying the spectrum sharing. Therefore, it is important in the art to avoid such interference as destroying the spectrum sharing among the parties in a spectrum sharing system.

SUMMARY

The following presents a simplified summary of one or more aspects to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One aspect of the present disclosure provides a base station of an operator in a spectrum sharing system. The base station may comprise a sensor, a transceiver and a processor connected with the sensor and the transceiver. The sensor is configured to sense signals over a shared spectrum. The transceiver is configured to receive at least one measurement report transmitted from at least one user terminal regarding signals over the shared spectrum sensed by the at least one user terminal. The processor is configured to determine whether to utilize the shared spectrum according to the signals over the shared spectrum sensed by the sensor or acquired from the at least one measurement report.

One aspect of the present disclosure provides a user terminal of an operator in a spectrum sharing system. The user terminal may comprise a sensor, a processor connected with the sensor and a transceiver connected with the processor. The sensor is configured to sense signals over a shared spectrum. The processor is configured to generate a measurement report regarding the signals over the shared spectrum. The transceiver is configured to transmit the measurement report to a base station so that the base station determines whether to utilize the shared spectrum according the signals over the shared spectrum.

One aspect of the present disclosure provides a method for determining usage of a shared spectrum in a spectrum sharing system. The method may comprise: sensing signals over a shared spectrum or receiving at least one measurement report transmitted from at least one user terminal regarding signals over the shared spectrum sensed by the at least one user terminal by a base station owned by an operator; and determining whether to utilize the shared spectrum according to the signals over the shared spectrum by the base station.

In summary, a base station, a user terminal and a method for determining usage of a shared spectrum in a spectrum sharing system are disclosed. The base station by itself can estimate the interference which may destroy spectrum sharing over a shared spectrum beforehand by detecting signals over the shared spectrum or by acquiring the signals over the shared spectrum from at least one measurement report transmitted by at least one user terminal, and accordingly determine whether to utilize the shared spectrum. In such a way, the base station can appropriately control interference to itself or to other parties over the shared spectrum to avoid such interference as destroying spectrum sharing appearing over the shared spectrum.

Other implement details and exemplary embodiments will be apparent from the following description accompanied with the appended drawings. Also, it is understood that other aspects will become readily apparent to those of ordinary skill in the art from the following description accompanied with the appended drawings.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those of ordinary skill in the art that these concepts may be practiced without these specific details. In some instances, well-known structures and components are shown in block diagram form to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), CDMA2000, etc. UTRA includes Wideband CDMA (WCDMA) and other variants of CDMA. CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication Systems (UMTS). 3GPP Long Term Evolution (LTE) and LTE-Advanced (LTE-A) are new releases of UMTS that use E-UTRA. UTRA, E-UTRA, UMTS, LTE, LTE-A and GSM; all of which are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE. LTE terminology is used in much of the description below.

Figure 1:
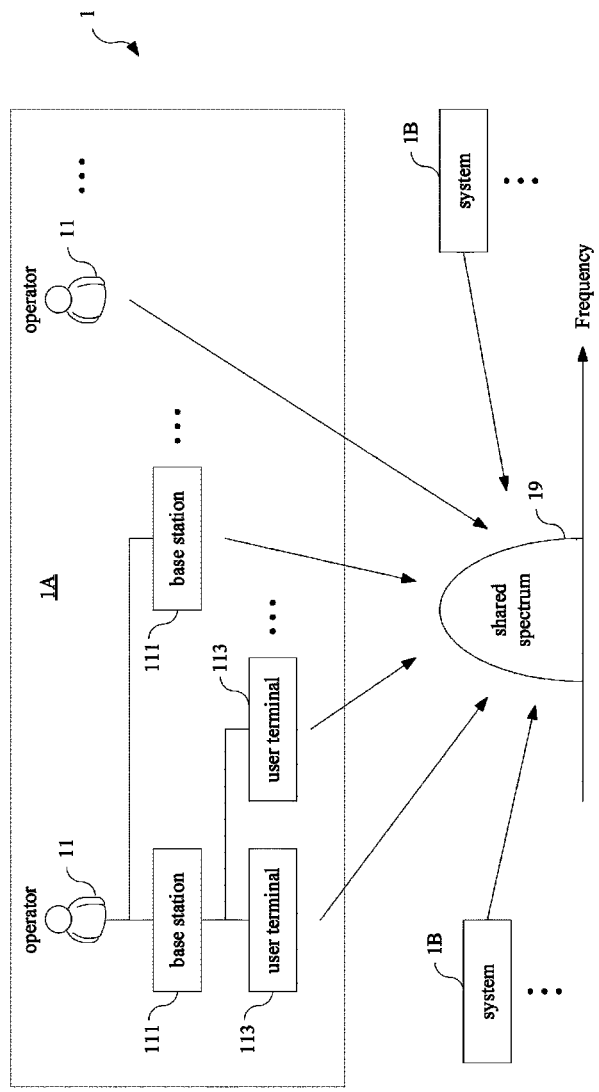
FIG. 1 is a schematic view conceptually illustrating a spectrum sharing system according to one or more embodiments.

One aspect of the present disclosure provides a base station of an operator in a spectrum sharing system, which will be described with FIGS. 1-6. FIG. 1 is a schematic view conceptually illustrating a spectrum sharing system according to one or more embodiments. As shown in FIG. 1, a spectrum sharing system 1 may comprise a communication system 1A (e.g., LTE systems) including at least one operator 11 which owns at least one base station 111 which controls at least one user terminal 113 and other communication systems 1B (e.g., LTE systems, Wi-Fi systems, radar systems, etc.), and provide a shared spectrum 19 for spectrum sharing. In the communication system 1A, the spectrum sharing may occur among two or more user terminals 113 which are controlled by one base station 111 under one operator 11. The spectrum sharing may occur among two or more user terminals 113 which are controlled by different base stations 111 under one operator 11. The spectrum sharing may further occur among two or more user terminals 113 which are controlled by different base stations 111 under different operators 11. Also, the spectrum sharing may occur among the communication systems including the communication system 1A and the communication systems 1B.

Figure 2:
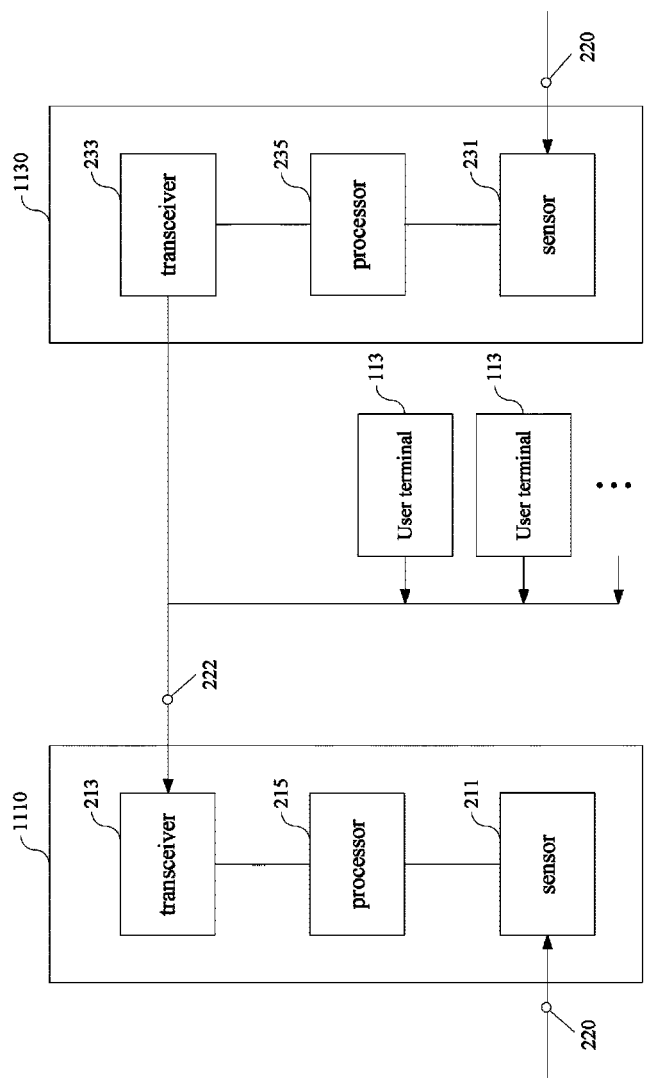
FIG. 2 is a block diagram conceptually illustrating a base station and a user terminal according to one or more embodiments.

FIG. 2 is a block diagram conceptually illustrating a base station 1110 and a user terminal 1130 according to one or more embodiments. Referring to FIGS. 1-2, the base station 1110 may be either of the base stations 111 and the user terminal 1130 may be either of the user terminals 113 controlled by the base station 1110.

The base station 1110 may comprise a sensor 211, a transceiver 213 and a processor 215. The sensor 211, the transceiver 213 and the processor 215 are connected with each other. The sensor 211 may optionally sense signals 220 over the shared spectrum 19. For example, the sensor 211 may include a wireless sensing device to actively sense the signals 220 over the shared spectrum 19. The sensor 211 may sense the signals 220 which include various signals transmitted over the shared spectrum 19 by any of the base stations 111 or any of the user terminals 113 of the communication system 1A and generated by the communication systems 1B except the signals which the base station 1110 including the sensor 211 or the user terminal 1130 controlled by the base station 1110 transmits over the shared spectrum 19. The transceiver 213 may optionally receive at least one measurement report 222 regarding the signals 220 from the user terminal 1130 and/or other user terminals 113. For example, the transceiver 213 may include a wireless receiver to passively receive the at least one measurement report 222 regarding the signals 220 over the shared spectrum 19. The processor 215 may be an electronic circuitry within the base station 1110 that carries out the instructions of a program by performing the basic arithmetic, logical, control and input/output (I/O) operations specified by the instructions. For example, the processor 215 may be a single-core or multi-core processor including one or more central processing unit (CPU). The processor 215 may also be a microprocessor which is contained on a single integrated circuit (IC) chip which contain, in addition to one or more CPU, memory, peripheral interfaces, and other components for computation. The processor 215 may determine whether to utilize the shared spectrum 19 according to the signals 220 over the shared spectrum 19 sensed by the sensor 211 or acquired from the at least one measurement report 222.

The user terminal 1130 may comprise a sensor 231, a transceiver 233 and a processor 235. The sensor 231, the transceiver 233 and the processor 235 are connected with each other. The sensor 231 may sense signals 220 over the shared spectrum 19. For example, the sensor 231 may include a wireless sensing device to sense the signals 220 over the shared spectrum 19. The sensor 231 may sense the signals 220 which include various signals transmitted over the shared spectrum 19 by any of the base stations 111 or any of the user terminals 113 of the communication system 1A and generated by the communication systems 1B except the signals which the user terminal 1130 including the sensor 231 or the base station 1110 controls the user terminal 1130 transmits over the shared spectrum 19. The processor 235 may be an electronic circuitry within the user terminal 1130 that carries out the instructions of a program by performing the basic arithmetic, logical, control and input/output (I/O) operations specified by the instructions. For example, the processor 235 may be a single-core or multi-core processor including one or more central processing unit (CPU). The processor 235 may also be a microprocessor which is contained on a single integrated circuit (IC) chip which contain, in addition to one or more CPU, memory, peripheral interfaces, and other components for computation. The processor 235 may generate a measurement report 222 regarding the signals 220 over the shared spectrum 19. The transceiver 233 may transmit the measurement report 222 to the base station 1110. For example, the transceiver 233 may include a wireless transmitter to transmit the measurement report 222 to the base station 1110.

Figure 3:
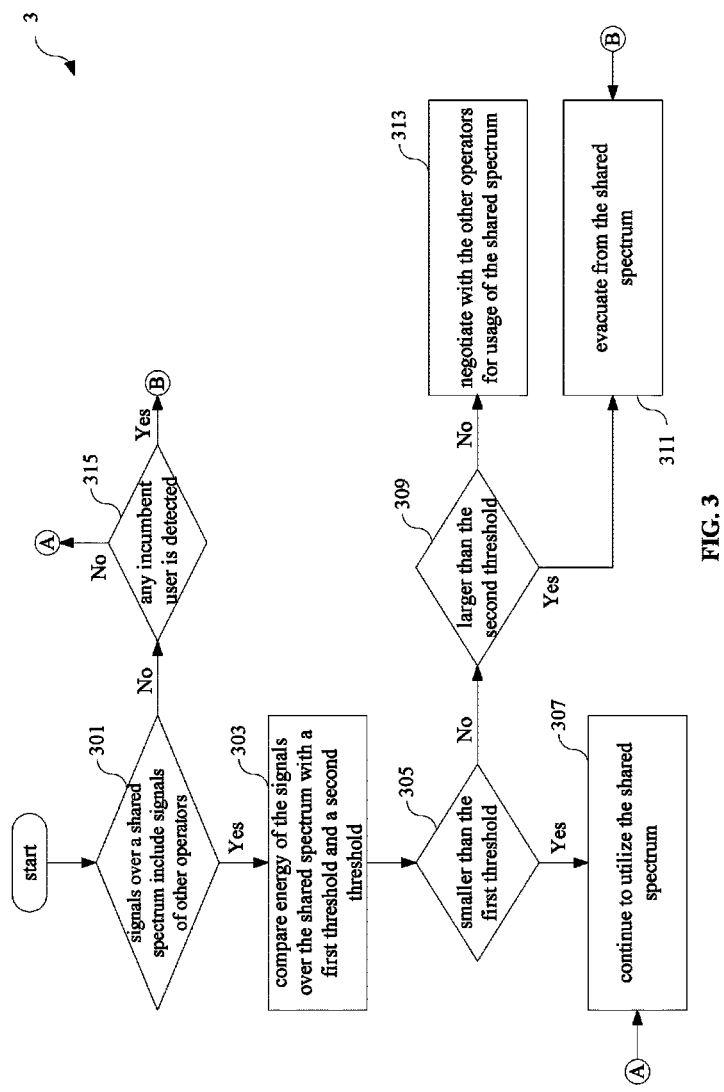
FIG. 3 is a schematic view conceptually illustrating an implement example of the base station according to one or more embodiments.

FIG. 3 is a schematic view conceptually illustrating an implement example 3 of the base station 1110 according to one or more embodiments. The implement example 3 is performed in a case where the base station 1110 and at least one user terminal 1130 controlled by the base station 1110 have operated on a shared spectrum 19 which is a licensed spectrum under a Licensed Shared Access (LSA) architecture. Under the LSA architecture, a limited number of licensees under an individual licensing regime in the shared spectrum 19 are already assigned one or more incumbent users, and the additional users (e.g., the base station 1110 and the at least one user terminal 1130 controlled by the base station 1110) are authorized to use the shared spectrum 19 in accordance with sharing rules included in their rights of use of spectrum. Under the LSA architecture, the sensor 211 of the base station 1110 or the sensor 231 of the at least one user terminal 1130 may sense signals 220 over the shared spectrum 19 as no transmission is performed among the base station 1110 and the at least one user terminal 1130 controlled by the base station 1110. Therefore, the signals detected by the sensor 211 or the sensor 231 do not include the signals which the base station 1110 including the sensor 211 or the user terminal 1130 including the sensor 231 transmits over the shared spectrum 19. However, if the signals detected by the sensor 211 or the sensor 231 include the signals which the base station 1110 including the sensor 211 or the user terminal 1130 including the sensor 231 transmits over the shared spectrum 19, those self-signals may be subtracted from the sensed signals 220 before the following processes of the processor 215.

Referring to FIG. 3, the processor 215 may determine whether the signals 220 over the shared spectrum 19 which is detected by the sensor 211 or acquired from the measurement report 222 include signals of other different operators 11 (referring to action 301). That is, the processor 215 may determine whether there are other operators 11 utilizing the shared spectrum 19. If the determination at the action 301 is positive, the processor 215 may compare energy of the signals 220 over the shared spectrum 19 with a first threshold and a second threshold being larger than the first threshold (referring to action 303).

If the energy of the signals 220 over the shared spectrum 19 is smaller than the first threshold, the processor 215 may enable the base station 1110 and the at least one user terminal 1130 controlled by the base station 1110 to continue to utilize the shared spectrum 19 because the interference now is acceptable to all of the parties over the shared spectrum 19 (referring to actions 305 and 307). That is, the base station 1110 and the at least one user terminal 1130 controlled by the base station 1110 can continue to operate on the shared spectrum 19. If the energy of the signals 220 over the shared spectrum 19 is larger than the second threshold, the processor 215 may enable the base station 1110 and the at least one user terminal 1130 controlled by the base station 1110 to evacuate from the shared spectrum 19 to avoid such interference as destroying spectrum sharing appearing over the shared spectrum 19 (referring to actions 305, 309 and 311). Regarding the evacuation, the base station 1110 may be shut down immediately or after the current task is completed for example. Also, the base station 1110 may informs a core network (not shown) for the evacuation and initiate the at least one user terminal 1130 controlled by the base station 1110 to perform a carrier reconfiguration, a hand over or a cell re-selection.

If the energy of the signals 220 over the shared spectrum 19 is larger than the first threshold but smaller than the second threshold, the processor 215 may enable the operator 11 including the base station 1110 to negotiate with the other different operators 11 for usage of the shared spectrum 19 (referring to actions 305, 309 and 313). For example, the base station 1110 may inform a negotiation device (not shown) including a database which stores information of usage status of the shared spectrum 19 to negotiate among the operator 11 owning the base station 1110 and the other different operators 11. If the shared spectrum 19 includes one channel, the operator 11 owning the base station 1110 may negotiate with the other different operators 11 according to the instruction of the negotiation device as for which should preferably use the channel. If the shared spectrum 19 includes a plurality of channels, the operator 11 owning the base station 1110 may negotiate with the other different operators 11 according to the instruction of the negotiation device as for how to deal with these channels in an optimal way. If the operator 11 owning the base station 1110 succeeds in the negotiation, the base station 1110 and the at least one user terminal 1130 controlled by the base station 1110 may continue to utilize the shared spectrum 19. However, in the worst case, the base station 1110 and the at least one user terminal 1130 controlled by the base station 1110 may need to evacuate from the shared spectrum 19.

Turning back to action 301, if the determination is negative, the processor 215 may detect whether any incumbent user has operated on the shared spectrum 19 in conventional methods (referring to action 315). For example, the processor 215 may compare the energy of the signals 220 over the shared spectrum 19 with one threshold. If the energy of the signals 220 over the shared spectrum 19 is larger than the threshold, the processor 215 may determine that one or more incumbent users have operated on the shared spectrum 19. Reversely, the processor 215 may determine that no incumbent user has operated on the shared spectrum 19.

If the determination at the action 315 is positive, the processor 215 may enable the base station 1110 and the at least one user terminal 1130 controlled by the base station 1110 to evacuate from the shared spectrum 19 (i.e., going back to action 311). Reversely, the processor 215 may enable the base station 1110 and the at least one user terminal 1130 controlled by the base station 1110 to continue to utilize the shared spectrum 19 (i.e., going back to action 307).

Figure 4A:
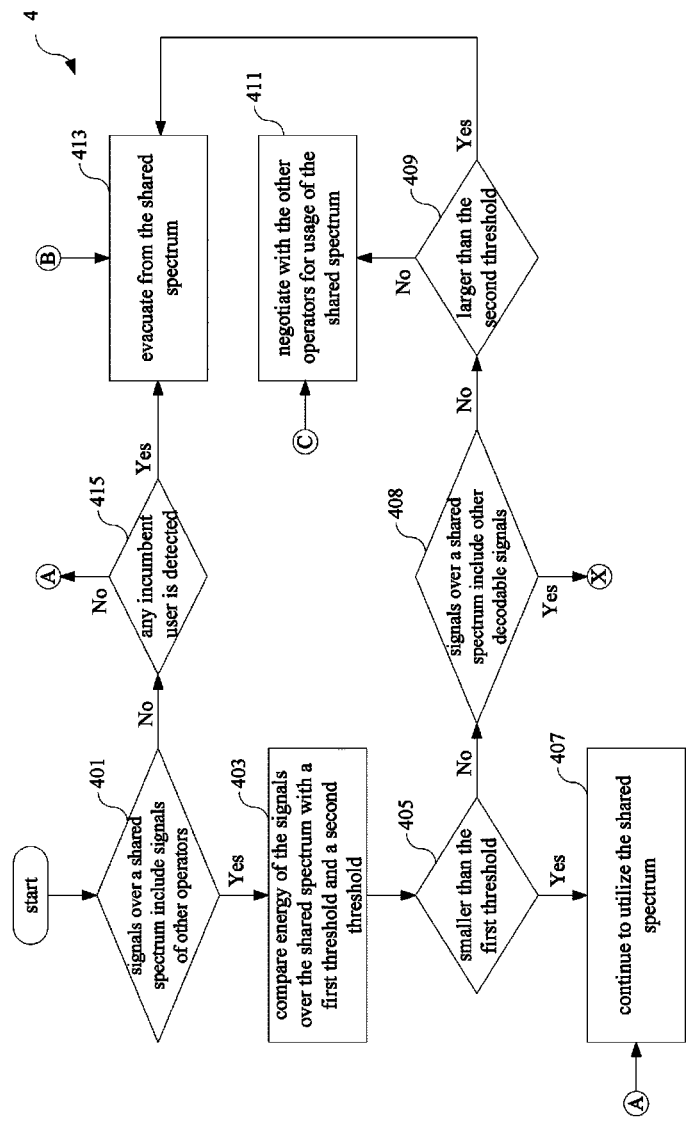
FIGS. 4A-4B is a schematic view conceptually illustrating another implement example of the base station according to one or more embodiments.
Figure 4B:
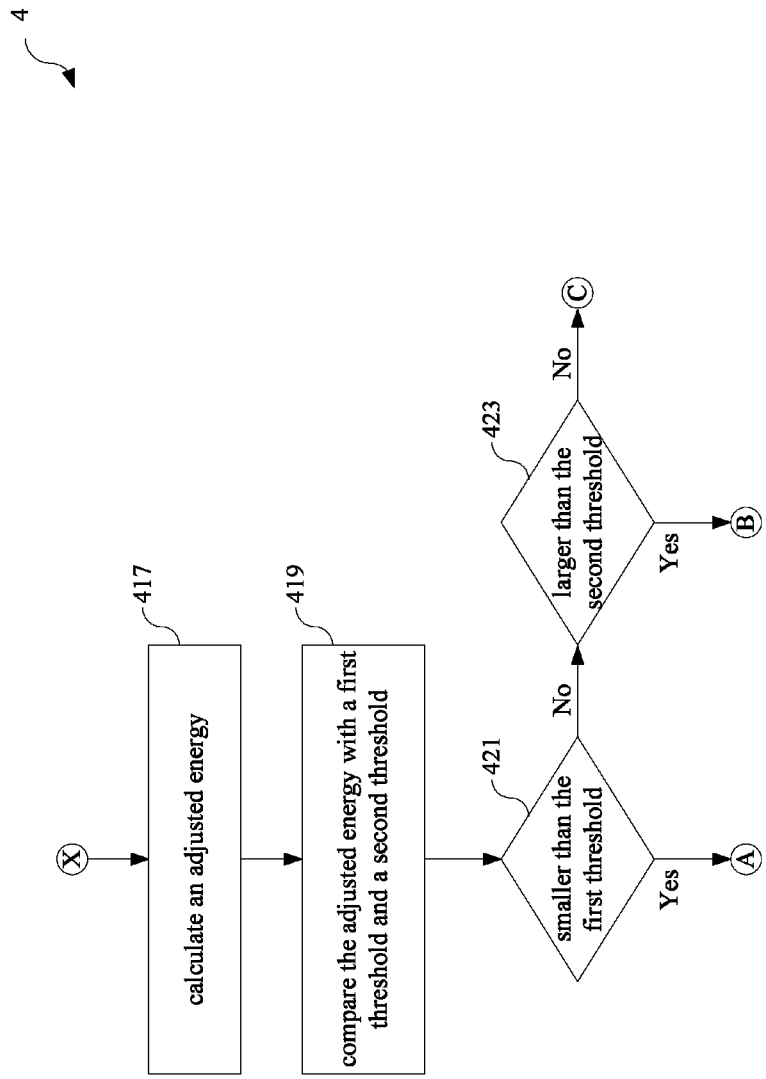

FIGS. 4A-4B is a schematic view conceptually illustrating another implement example 4 of the base station 1110 according to one or more embodiments. The implement example 4 is also performed in a case where the base station 1110 and at least one user terminal 1130 controlled by the base station 1110 have operated on a shared spectrum 19 which is a licensed spectrum under the LSA architecture.

Referring to FIGS. 4A-4B, the processor 215 may determine whether the signals 220 over the shared spectrum 19 which is detected by the sensor 211 or acquired from the measurement report 222 include signals of other different operators 11 (referring to action 401). That is, the processor 215 may determine whether there are other operators 11 utilizing the shared spectrum 19. If the determination at the action 401 is positive, the processor 215 may compare energy of the signals 220 over the shared spectrum 19 with a first threshold and a second threshold being larger than the first threshold (referring to action 403).

If the energy of the signals 220 over the shared spectrum 19 is smaller than the first threshold, the processor 215 may enable the base station 1110 and the at least one user terminal 1130 controlled by the base station 1110 to continue to utilize the shared spectrum 19 because the interference now is acceptable to all of the parties over the shared spectrum 19 (referring to actions 405 and 407). That is, the base station 1110 and the at least one user terminal 1130 controlled by the base station 1110 can continue to operate on the shared spectrum 19. If the energy of the signals 220 over the shared spectrum 19 is larger than the first threshold, the processor 215 may determine whether the signals 220 over the shared spectrum 19 include other decodable signals which are not generated by the base station 1110 or the at least one user terminal 1130 controlled by the base station 1110 (referring to actions 405 and 408).

The other decodable signals may be generated by other base stations 111 or user terminals 113 owned by the same operator 11 or the other different operators 11. For example, the base station 1110 may readily obtain information regarding signals which are transmitted over the shared spectrum 19 by other base stations 111 or user terminals 113 under the same operator 11 so that such signals may be decoded by the base station 1110. Likewise, the base station 1110 may sometimes obtain information, by information exchange among operators 11 for example, regarding signals which are transmitted over the shared spectrum 19 by other base stations 111 or user terminals 113 under other operators 11 so that such signals may possibly be decoded by the base station 1110. Under either of the circumstances, the base station 1110 and the at least one user terminal 1130 controlled by the base station 1110 may remove or mitigate the interference caused by the other decodable signals which are not generated by the base station 1110 or the at least one user terminal 1130 controlled by the base station 1110 in various interference removing/mitigation methods.

Therefore, if the determination at the action 408 is negative, the processor 215 may determine whether the energy of the signals 220 over the shared spectrum 19 is larger than the second threshold (referring to action 409). If the energy of the signals 220 over the shared spectrum 19 is larger than the second threshold, the processor 215 may enable the base station 1110 and the at least one user terminal 1130 controlled by the base station 1110 to evacuate from the shared spectrum 19 to avoid such interference as destroying spectrum sharing appearing over the shared spectrum 19 (referring to actions 409 and 413). The evacuation in the implement example 4 may be performed as the same mentioned in the implement example 3.

If the energy of the signals 220 over the shared spectrum 19 is smaller than the second threshold, the processor 215 may enable the operator 11 owning the base station 1110 to negotiate with the other different operators 11 for usage of the shared spectrum 19 (referring to actions 409 and 411). The negotiation in the implement example 4 may be performed as the same mentioned in the implement example 3. If the operator 11 owning the base station 1110 succeeds in the negotiation, the base station 1110 and the at least one user terminal 1130 controlled by the base station 1110 may continue to utilize the shared spectrum 19. However, in the worst case, the base station 1110 and the at least one user terminal 1130 controlled by the base station 1110 may need to evacuate from the shared spectrum 19.

On the other hand, if the determination at the action 408 is positive, the processor 215 may calculate an adjusted energy by deducting energy of the other decodable signals from the energy of the signals 220 over the shared spectrum 19 (referring to action 417). Then, the processor 215 may compare the adjusted energy with the first threshold and the second threshold (referring to action 419).

If the adjusted energy is smaller than the first threshold, the processor 215 may enable the base station 1110 and the at least one user terminal 1130 controlled by the base station 1110 to continue to utilize the shared spectrum 19 (referring to actions 421 and 407). If the adjusted energy is larger than the second threshold, the processor 215 may enable the base station 1110 and the at least one user terminal 1130 controlled by the base station 1110 to evacuate from the shared spectrum 19 (referring to actions 421, 423 and 413).

If the adjusted energy is larger than the first threshold but smaller than the second threshold, the processor 215 may enable the operator 11 including the base station 1110 to negotiate with the other different operators 11 for usage of the shared spectrum 19 (referring to actions 421, 423 and 411). If the operator 11 including the base station 1110 succeeds in the negotiation, the base station 1110 and the at least one user terminal 1130 controlled by the base station 1110 may continue to utilize the shared spectrum 19. However, in the worst case, the base station 1110 and the at least one user terminal 1130 controlled by the base station 1110 may need to evacuate from the shared spectrum 19.

According to one or more embodiments, the processor 215 may compare the adjusted energy with a third threshold at action 419 only. Then, the processor 215 may determine whether the adjusted energy is larger than the third threshold. If the adjusted energy is larger than the third threshold, the processor 215 may enable the base station 1110 and the at least one user terminal 1130 controlled by the base station 1110 to evacuate from the shared spectrum 19. Reversely, the processor 215 may enable the base station 1110 and the at least one user terminal 1130 controlled by the base station 1110 to continue to utilize the shared spectrum 19. The third threshold may be one of the first threshold, the second threshold and a predefined threshold.

Turning back to action 401, if the determination is negative, the processor 215 may detect whether any incumbent user has operated on the shared spectrum 19 in conventional methods (referring to action 415). For example, the processor 215 may compare the energy of the signals 220 over the shared spectrum 19 with one threshold. If the energy of the signals 220 over the shared spectrum 19 is larger than the threshold, the processor 215 may determine that one or more incumbent users have operated on the shared spectrum 19. Reversely, the processor 215 may determine that no incumbent user has operated on the shared spectrum 19.

If the determination at the action 415 is positive, the processor 215 may enable the base station 1110 and the at least one user terminal 1130 controlled by the base station 1110 to evacuate from the shared spectrum 19 (i.e., going back to action 413). Reversely, the processor 215 may enable the base station 1110 and the at least one user terminal 1130 controlled by the base station 1110 to continue to utilize the shared spectrum 19 (i.e., going back to action 407).

Comparing with conventional spectrum sharing methods, the base station 1110 not only avoids such interference as destroying spectrum sharing appearing over the shared spectrum 19 but also provides a speedy way to determine whether to utilize the shared spectrum because the determination is made without via a terminal management system such as operations, administration and maintenance (OA&M) under the LSA architecture.

In addition to the implement examples 3 and 4, the following implement example may also be performed according to one or more embodiments in a case where the base station 1110 and at least one user terminal 1130 controlled by the base station 1110 have not operated on a shared spectrum 19 which is a licensed spectrum under the LSA architecture. At the beginning, the processor 215 may determines whether the signals 220 over the shared spectrum 19 include other decodable signals of the same operator 11 which are not generated by the base station 1110 or the at least one user terminal 1130 controlled by the base station 1110. Next, the processor 215 may calculate an adjusted energy by deducting energy of the other decodable signals of the same operator 11 from the energy of the signals 220 over the shared spectrum 19, as determining that the signals 220 over the shared spectrum 19 include the other decodable signals of the same operator 11. Then, the processor 215 may compare the adjusted energy with a threshold. The processor 215 may enable the base station 1110 and the at least one user terminal 1130 controlled by the base station 1110 to continue to utilize the shared spectrum 19, if the adjusted energy is smaller than the threshold. The processor 215 may enable the base station 1110 and the at least one user terminal 1130 controlled by the base station 1110 to evacuate from the shared spectrum 19, if the adjusted energy is larger than the threshold.

Figure 5:
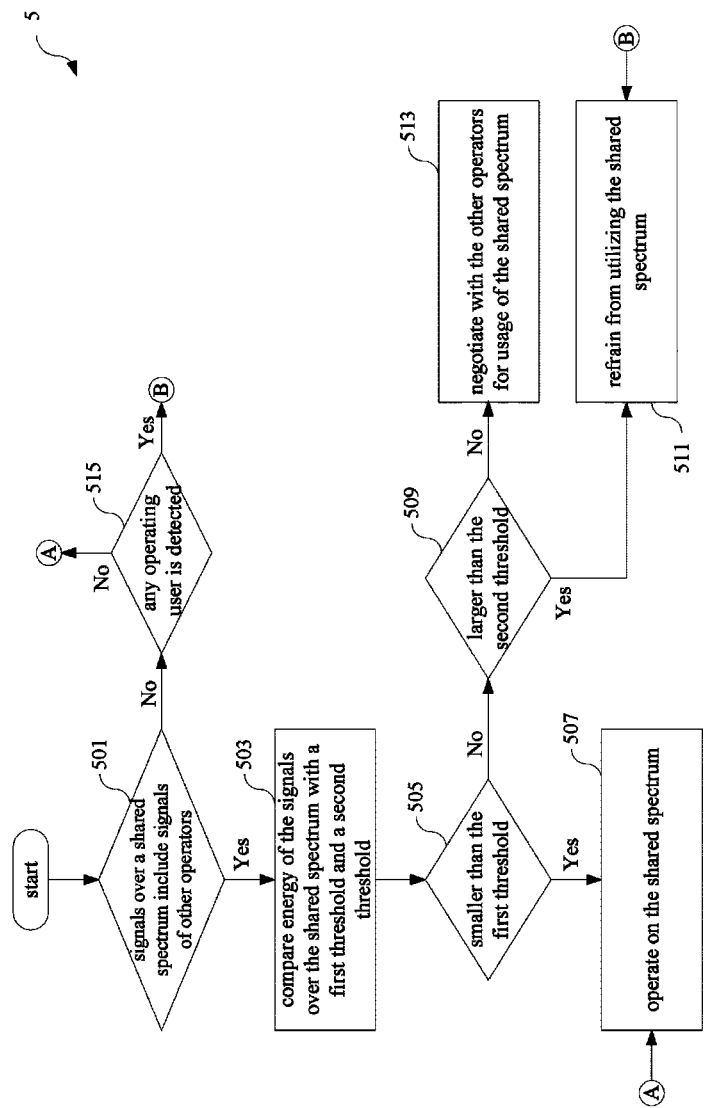
FIG. 5 is a schematic view conceptually illustrating a further implement example of the base station according to one or more embodiments.

FIG. 5 is a schematic view conceptually illustrating an implement example 5 of the base station 1110 according to one or more embodiments. The implement example 5 is performed in a case where the base station 1110 and at least one user terminal 1130 controlled by the base station 1110 have not operated on a shared spectrum 19 which is an unlicensed spectrum under a Licensed Assisted Access (LAA) architecture. Under the LAA architecture, a user (e.g., the base station 1110 and the at least one user terminal 1130 controlled by the base station 1110) to which a licensed spectrum has assigned can use a contention protocol known as listen-before-talk (LBT) to coexist with other users (e.g., Wi-Fi users) over the shared spectrum 19. Under the LAA architecture, the sensor 211 of the base station 1110 or the sensor 231 of the at least one user terminal 1130 may sense signals 220 over the shared spectrum 19 before any transmission is performed among the base station 1110 and the at least one user terminal 1130 controlled by the base station 1110. Therefore, the signals detected by the sensor 211 or the sensor 231 do not include the signals which the base station 1110 including the sensor 211 or the user terminal 1130 including the sensor 231 transmits over the shared spectrum 19.

Referring to FIG. 5, during a clear channel assessment (CCA) window in which the processor 215 initiates LBT, the processor 215 may determine whether the signals 220 over the shared spectrum 19 which is detected by the sensor 211 or acquired from the measurement report 222 include signals of other different operators 11 (referring to action 501). That is, the processor 215 may determine whether there are other operators 11 utilizing the shared spectrum 19. If the determination at the action 501 is positive, the processor 215 may compare energy of the signals 220 over the shared spectrum 19 with a first threshold and a second threshold being larger than the first threshold (referring to action 503).

If the energy of the signals 220 over the shared spectrum 19 is smaller than the first threshold, the processor 215 may enable the base station 1110 and the at least one user terminal 1130 controlled by the base station 1110 to operate on the shared spectrum 19 because the interference now is acceptable to all of the parties over the shared spectrum 19 (referring to actions 505 and 507). For example, the base station 1110 may assign resources regarding the shared spectrum 19 to the at least one user terminal 1130 controlled by the base station 1110 and start to operate on the shared spectrum 19 with the at least one user terminal 1130 according to the resource.

If the energy of the signals 220 over the shared spectrum 19 is larger than the second threshold, the processor 215 may also enable the base station 1110 and the at least one user terminal 1130 controlled by the base station 1110 to refrain from operating on the shared spectrum 19 to avoid such interference as destroying spectrum sharing appearing over the shared spectrum 19 (referring to actions 505, 509 and 511). For example, the base station 1110 may determine not to assign resources regarding the shared spectrum 19 to the at least one user terminal 1130 controlled by the base station 1110 and try to use other shared spectra for their transmission.

If the energy of the signals 220 over the shared spectrum 19 is larger than the first threshold but smaller than the second threshold, the processor 215 may enable the operator 11 including the base station 1110 to negotiate with the other different operators 11 for usage of the shared spectrum 19 (referring to actions 505, 509 and 513). For example, the base station 1110 may inform a negotiation device (not shown) including a database which stores information of usage status of the shared spectrum 19 to negotiate among the operator 11 owning the base station 1110 and the other different operators 11. If the shared spectrum 19 includes one channel, the operator 11 including the base station 1110 may negotiate with the other different operators 11 according to the instruction of the negotiation device as for which should preferably use the channel. If the shared spectrum 19 includes a plurality of channels, the operator 11 including the base station 1110 may negotiate with the other different operators 11 according to the instruction of the negotiation device as for how to deal with these channels in an optimal way. If the operator 11 including the base station 1110 succeeds in the negotiation, the base station 1110 and the at least one user terminal 1130 controlled by the base station 1110 may get ready to operate on the shared spectrum 19. However, in the worst case, the base station 1110 and the at least one user terminal 1130 controlled by the base station 1110 may need to refrain from operating on the shared spectrum 19.

Turning back to action 501, if the determination is negative, the processor 215 may detect whether any operating user has operated on the shared spectrum 19 in conventional methods (referring to action 515). For example, the processor 215 may compare the energy of the signals 220 over the shared spectrum 19 with one threshold. If the energy of the signals 220 over the shared spectrum 19 is larger than the threshold, the processor 215 may determine that one or more operating users have operated on the shared spectrum 19. Reversely, the processor 215 may determine that no operating user has operated on the shared spectrum 19.

If the determination at the action 515 is positive, the processor 215 may enable the base station 1110 and the at least one user terminal 1130 controlled by the base station 1110 to refrain from operating on the shared spectrum 19 to avoid such interference as destroying spectrum sharing appear over the shared spectrum 19 (i.e., going back to action 511). Reversely, the processor 215 may enable the base station 1110 and the at least one user terminal 1130 controlled by the base station 1110 to operate on the shared spectrum 19 (i.e., going back to action 507).

Figure 6A:
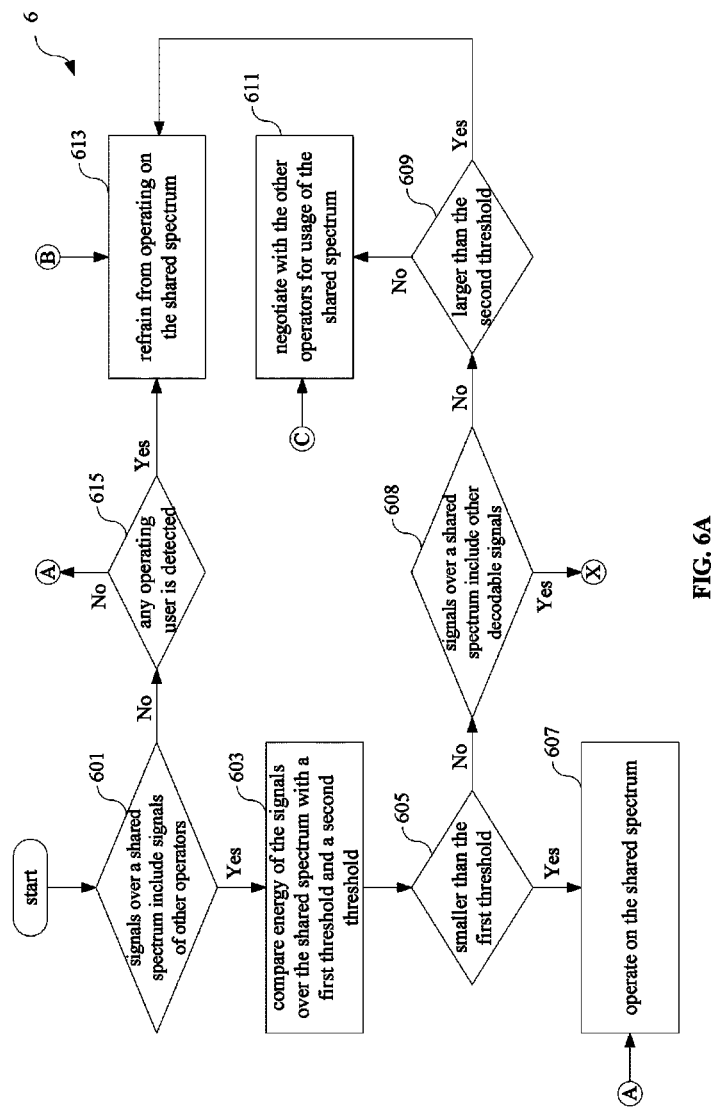
FIGS. 6A-6B is a schematic view conceptually illustrating an additional implement example of the base station according to one or more embodiments.
Figure 6B:
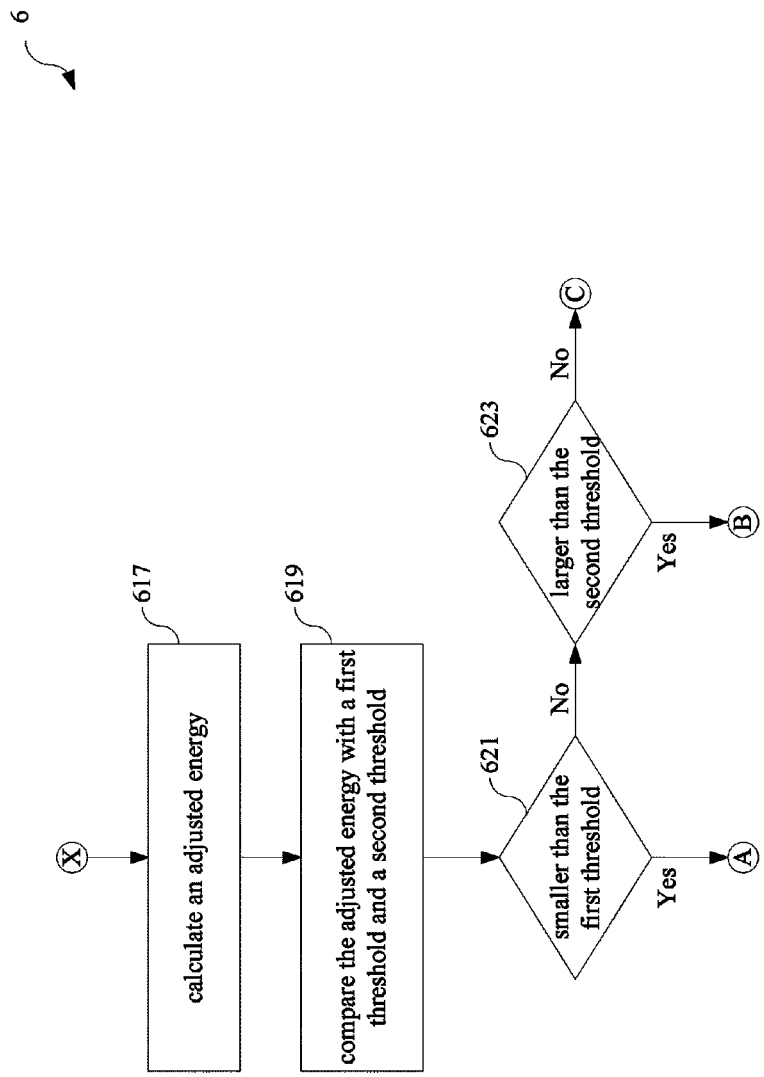

FIGS. 6A-6B is a schematic view conceptually illustrating another implement example 6 of the base station 1110 according to one or more embodiments. The implement example 6 is also performed in a case where the base station 1110 and at least one user terminal 1130 controlled by the base station 1110 have not operated on a shared spectrum 19 which is an unlicensed spectrum under the LAA architecture.

Referring to FIGS. 6A-6B, during a CCA window in which the processor 215 initiates LBT, the processor 215 may determine whether the signals 220 over the shared spectrum 19 which is detected by the sensor 211 or acquired from the measurement report 222 include signals of other different operators 11 (referring to action 601). That is, the processor 215 may determine whether there are other operators 11 utilizing the shared spectrum 19. If the determination at the action 601 is positive, the processor 215 may compare energy of the signals 220 over the shared spectrum 19 with a first threshold and a second threshold being larger than the first threshold (referring to action 603).

If the energy of the signals 220 over the shared spectrum 19 is smaller than the first threshold, the processor 215 may enable the base station 1110 and the at least one user terminal 1130 controlled by the base station 1110 to operate on the shared spectrum 19 because the interference now is acceptable to all of the parties over the shared spectrum 19 (referring to actions 605 and 607). For example, the base station 1110 may assign resources regarding the shared spectrum 19 to the at least one user terminal 1130 controlled by the base station 1110 and start to operate on the shared spectrum 19 with the at least one user terminal 1130 according to the resource. If the energy of the signals 220 over the shared spectrum 19 is larger than the first threshold, the processor 215 may determine whether the signals 220 over the shared spectrum 19 include other decodable signals which are not generated by the base station 1110 or the at least one user terminal 1130 controlled by the base station 1110 (referring to actions 605 and 608). For example, the base station 1110 may determine not to assign resources regarding the shared spectrum 19 to the at least one user terminal 1130 controlled by the base station 1110 and try to use other shared spectra for their transmission.

The other decodable signals may be generated by other base stations 111 or user terminals 113 owned by the same operator 11 or the other different operators 11. For example, the base station 1110 may readily obtain information regarding signals which are transmitted over the shared spectrum 19 by other base stations 111 or user terminals 113 under the same operator 11 so that such signals may be decoded by the base station 1110. Likewise, the base station 1110 may sometimes obtain information, by information exchange among operators 11 for example, regarding signals which are transmitted over the shared spectrum 19 by other base stations 111 or user terminals 113 under other operators 11 so that such signals may possibly be decoded by the base station 1110. Under either of the circumstances, the base station 1110 and the at least one user terminal 1130 controlled by the base station 1110 may remove or mitigate the interference caused by the other decodable signals which are not generated by the base station 1110 or the at least one user terminal 1130 controlled by the base station 1110 in various interference removing/mitigation methods.

Therefore, if the determination at the action 608 is negative, the processor 215 may determine whether the energy of the signals 220 over the shared spectrum 19 is larger than the second threshold (referring to action 609). If the energy of the signals 220 over the shared spectrum 19 is larger than the second threshold, the processor 215 may enable the base station 1110 and the at least one user terminal 1130 controlled by the base station 1110 to refrain from operating on the shared spectrum 19 to avoid such interference as destroying spectrum sharing appearing over the shared spectrum 19 (referring to actions 609 and 613).

If the energy of the signals 220 over the shared spectrum 19 is smaller than the second threshold, the processor 215 may enable the operator 11 including the base station 1110 to negotiate with the other different operators 11 for usage of the shared spectrum 19 (referring to actions 609 and 611). The negotiation in the implement example 6 may be performed as the same mentioned in the implement example 5. If the operator 11 including the base station 1110 succeeds in the negotiation, the base station 1110 and the at least one user terminal 1130 controlled by the base station 1110 may get ready to operate on the shared spectrum 19. However, in the worst case, the base station 1110 and the at least one user terminal 1130 controlled by the base station 1110 may need to refrain from operating on the shared spectrum 19.

On the other hand, if the determination at the action 608 is positive, the processor 215 may calculate an adjusted energy by deducting energy of the other decodable signals from the energy of the signals 220 over the shared spectrum 19 (referring to action 617). Then, the processor 215 may compare the adjusted energy with the first threshold and the second threshold (referring to action 619).

If the adjusted energy is smaller than the first threshold, the processor 215 may enable the base station 1110 and the at least one user terminal 1130 controlled by the base station 1110 to operate on the shared spectrum 19 (referring to actions 621 and 607). If the adjusted energy is larger than the second threshold, the processor 215 may enable the base station 1110 and the at least one user terminal 1130 controlled by the base station 1110 to refrain from operating on the shared spectrum 19 (referring to actions 621, 623 and 613).

If the adjusted energy is larger than the first threshold but smaller than the second threshold, the processor 215 may enable the operator 11 including the base station 1110 to negotiate with the other different operators 11 for usage of the shared spectrum 19 (referring to actions 621, 623 and 611). The negotiation in the implement example 6 may be performed as the same mentioned in the implement example 5. If the operator 11 including the base station 1110 succeeds in the negotiation, the base station 1110 and the at least one user terminal 1130 controlled by the base station 1110 may get ready to operate on the shared spectrum 19. However, in the worst case, the base station 1110 and the at least one user terminal 1130 controlled by the base station 1110 may need to refrain from operating on the shared spectrum 19.

According to one or more embodiments, the processor 215 may compare the adjusted energy with a third threshold at action 619 only. Then, the processor 215 may determine whether the adjusted energy is larger than the third threshold. If the adjusted energy is larger than the third threshold, the processor 215 may enable the base station 1110 and the at least one user terminal 1130 controlled by the base station 1110 to refrain from operating on the shared spectrum 19. Reversely, the processor 215 may enable the base station 1110 and the at least one user terminal 1130 controlled by the base station 1110 to operate on the shared spectrum 19.

Turning back to action 601, if the determination is negative, the processor 215 may detect whether any operating user has operated on the shared spectrum 19 in conventional methods (referring to actions 601 and 615). For example, the processor 215 may compare the energy of the signals 220 over the shared spectrum 19 with one threshold. If the energy of the signals 220 over the shared spectrum 19 is larger than the threshold, the processor 215 may determine that one or more operating users have operated on the shared spectrum 19. Reversely, the processor 215 may determine that no operating user has operated on the shared spectrum 19.

If the determination at the action 615 is positive, the processor 215 may enable the base station 1110 and the at least one user terminal 1130 controlled by the base station 1110 to refrain from operating on the shared spectrum 19 (i.e., going back to action 613). Reversely, the processor 215 may enable the base station 1110 and the at least one user terminal 1130 controlled by the base station 1110 to operate on the shared spectrum 19 (i.e., going back to action 607).

In addition to the implement examples 5 and 6, the following implement example may also be performed according to one or more embodiments in a case where the base station 1110 and at least one user terminal 1130 controlled by the base station 1110 have not operated on a shared spectrum 19 which is an unlicensed spectrum under the LAA architecture. At the beginning, the processor 215 may determines whether the signals 220 over the shared spectrum 19 include other decodable signals of the same operator 11 which are not generated by the base station 1110 or the at least one user terminal 1130 controlled by the base station 1110. Next, the processor 215 may calculate an adjusted energy by deducting energy of the other decodable signals of the same operator 11 from the energy of the signals 220 over the shared spectrum 19, as determining that the signals 220 over the shared spectrum 19 include the other decodable signals of the same operator 11. Then, the processor 215 may compare the adjusted energy with a threshold. The processor 215 may enable the base station 1110 and the at least one user terminal 1130 controlled by the base station 1110 to operate on the shared spectrum 19, if the adjusted energy is smaller than the threshold. The processor 215 may enable the base station 1110 and the at least one user terminal 1130 controlled by the base station 1110 to refrain from operating on the shared spectrum 19, if the adjusted energy is larger than the threshold. One aspect of the present disclosure provides a user terminal of an operator in a spectrum sharing system. The user terminal may comprise a sensor, a processor connected with the sensor and a transceiver connected with the processor. The sensor is configured to sense signals over a shared spectrum. The processor is configured to generate a measurement report regarding the signals over the shared spectrum. The transceiver is configured to transmit the measurement report to a base station so that the base station determines whether to utilize the shared spectrum according the signals over the shared spectrum. The user terminal may be any of the user terminals 113 and do all of what the user terminals 113 does.

Figure 7:
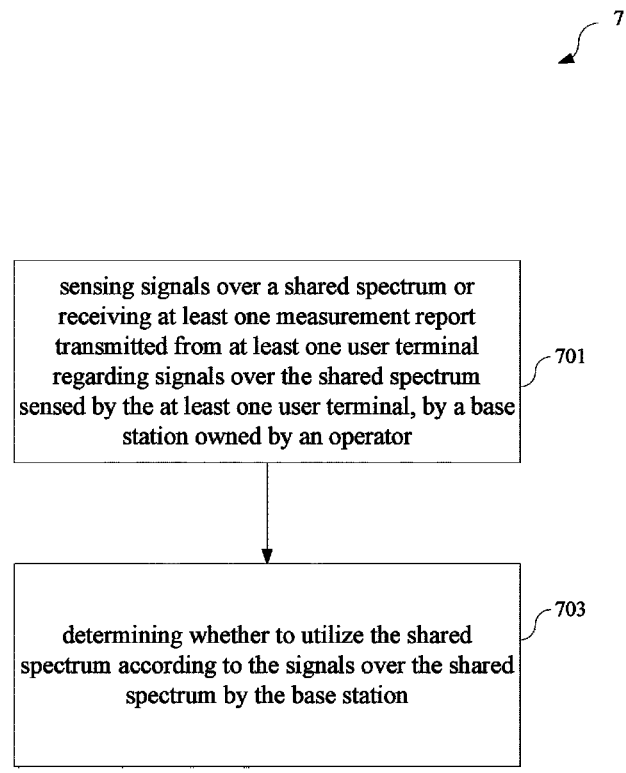
FIG. 7 is a flow chart conceptually illustrating a method for determining usage of a shared spectrum in a spectrum sharing system according to one or more embodiments.

One aspect of the present disclosure provides a method for determining usage of a shared spectrum in a spectrum sharing system. FIG. 7 is a flow chart conceptually illustrating a method for determining usage of a shared spectrum in a spectrum sharing system according to one or more embodiments. Referring to FIG. 7, the method 7 may comprise: sensing signals over a shared spectrum or receiving at least one measurement report transmitted from at least one user terminal regarding signals over the shared spectrum sensed by the at least one user terminal by a base station owned by an operator (referring to step 701); and determining whether to utilize the shared spectrum according to the signals over the shared spectrum by the base station (referring to step 703). The method may be applied to the spectrum sharing system 1 and include all of the steps corresponding to what the base stations 111 and the user terminals 113 do.

According to one or more embodiments, the method 7 may further comprise the following steps performed by the base station in a case where the base station and at least one user terminal controlled by the base station have operated on the shared spectrum: determining whether the signals over the shared spectrum include signals of other operators; comparing energy of the signals over the shared spectrum with a first threshold and a second threshold being larger than the first threshold as determining that the signals over the shared spectrum include signals of the other operators; enabling the base station and the at least one user terminal controlled by the base station to continue to utilize the shared spectrum, if the energy of the signals over the shared spectrum is smaller than the first threshold; enabling the operator to negotiate with the other operators for usage of the shared spectrum, if the energy of the signals over the shared spectrum is larger than the first threshold but smaller than the second threshold; and enabling the base station and the at least one user terminal controlled by the base station to evacuate from the shared spectrum, if the energy of the signals over the shared spectrum is larger than the second threshold.

According to one or more embodiments, the method 7 may further comprise the following steps performed by the base station in a case where the base station and at least one user terminal controlled by the base station have operated on the shared spectrum: determining whether the signals over the shared spectrum include signals of other operators; comparing energy of the signals over the shared spectrum with a first threshold and a second threshold being larger than the first threshold as determining that the signals over the shared spectrum include signals of the other operators; enabling the base station and the at least one user terminal controlled by the base station to continue to utilize the shared spectrum, if the energy of the signals over the shared spectrum is smaller than the first threshold; determining whether the signals over the shared spectrum include other decodable signals which are not generated by the base station or the at least one user terminal controlled by the base station, if the energy of the signals over the shared spectrum is larger than the first threshold; calculating an adjusted energy by deducting energy of the other decodable signals from the energy of the signals over the shared spectrum; comparing the adjusted energy with the first threshold and the second threshold; enabling the base station and the at least one user terminal controlled by the base station to continue to utilize the shared spectrum, if the adjusted energy is smaller than the first threshold; enabling the operator to negotiate with the other operators for usage of the shared spectrum, if the adjusted energy is larger than the first threshold but smaller than the second threshold; and enabling the base station and the at least one user terminal controlled by the base station to evacuate from the shared spectrum, if the adjusted energy is larger than the second threshold. Here, the other decodable signals may be generated by other base stations or user terminals owned by the operator or the other operators.

According to one or more embodiments, the method 7 may further comprise the following steps performed by the base station in a case where the base station and at least one user terminal controlled by the base station have operated on the shared spectrum: determining whether the signals over the shared spectrum include other decodable signals of the operator which are not generated by the base station or the at least one user terminal controlled by the base station; calculating an adjusted energy by deducting energy of the other decodable signals from the energy of the signals over the shared spectrum, as determining that the signals over the shared spectrum include the other decodable signals of the operator; comparing the adjusted energy with a threshold; enabling the base station and the at least one user terminal controlled by the base station to continue to utilize the shared spectrum, if the adjusted energy is smaller than the threshold; and enabling the base station and the at least one user terminal controlled by the base station to evacuate from the shared spectrum, if the adjusted energy is larger than the threshold.

According to one or more embodiments, the method 7 may further comprise the following steps performed by the base station in a case where the base station and at least one user terminal controlled by the base station have not operated on the shared spectrum: determining whether the signals over the shared spectrum include signals of other operators; comparing energy of the signals over the shared spectrum with a first threshold and a second threshold being larger than the first threshold as determining that the signals over the shared spectrum include signals of the other operators; enabling the base station and the at least one user terminal controlled by the base station to operate on the shared spectrum, if the energy of the signals over the shared spectrum is smaller than the first threshold; enabling the operator to negotiate with the other operators for usage of the shared spectrum, if the energy of the signals over the shared spectrum is larger than the first threshold but smaller than the second threshold; and enabling the base station and the at least one user terminal controlled by the base station to refrain from operating on the shared spectrum, if the energy of the signals over the shared spectrum is larger than the second threshold.

According to one or more embodiments, the method 7 may further comprise the following steps performed by the base station in a case where the base station and at least one user terminal controlled by the base station have not operated on the shared spectrum: determining whether the signals over the shared spectrum include signals of other operators; comparing energy of the signals over the shared spectrum with a first threshold and a second threshold being larger than the first threshold as determining that the signals over the shared spectrum include signals of the other operators; enabling the base station and the at least one user terminal controlled by the base station to operate on the shared spectrum, if the energy of the signals over the shared spectrum is smaller than the first threshold; determining whether the signals over the shared spectrum include other decodable signals which are not generated by the base station or the at least one user terminal controlled by the base station, if the energy of the signals over the shared spectrum is larger than the first threshold; calculating an adjusted energy by deducting energy of the other decodable signals from the energy of the signals over the shared spectrum; comparing the adjusted energy with the first threshold and the second threshold; enabling the base station and the at least one user terminal controlled by the base station to operate on the shared spectrum, if the adjusted energy is smaller than the first threshold; enabling the operator to negotiate with the other operators for usage of the shared spectrum, if the adjusted energy is larger than the first threshold but smaller than the second threshold; and enabling the base station and the at least one user terminal controlled by the base station to refrain from operating on the shared spectrum, if the adjusted energy is larger than the second threshold. Here, the other decodable signals may be generated by other base stations or user terminals owned by the operator and the other operators.

According to one or more embodiments, the method 7 may further comprise the following steps performed by the base station in a case where the base station and at least one user terminal controlled by the base station have not operated on the shared spectrum: determining whether the signals over the shared spectrum include other decodable signals of the operator which are not generated by the base station or the at least one user terminal controlled by the base station; calculating an adjusted energy by deducting energy of the other decodable signals from the energy of the signals over the shared spectrum, as determining that the signals over the shared spectrum include the other decodable signals of the operator; comparing the adjusted energy with a threshold; enabling the base station and the at least one user terminal controlled by the base station to operate on the shared spectrum, if the adjusted energy is smaller than the threshold; and enabling the base station and the at least one user terminal controlled by the base station to refrain from operating on the shared spectrum, if the adjusted energy is larger than the threshold.

According to one or more embodiments, the method 7 may further comprise the following steps: sensing the signals over the shared spectrum by the at least one user terminal; generating the at least one measurement report regarding the signals over the shared spectrum by the at least one user terminal; and transmitting the at least one measurement report to the base station by the at least one user terminal so that the base station determines whether to utilize the shared spectrum according to the signals over the shared spectrum.

According previous description of the disclosure, a base station, a user terminal and a method for determining usage of a shared spectrum in a spectrum sharing system is disclosed. The base station by itself can estimate the interference which may destroy spectrum sharing over a shared spectrum beforehand by detecting signals over the shared spectrum or by acquiring the signals over the shared spectrum from at least one measurement report transmitted by at least one user terminal, and accordingly determine whether to utilize the shared spectrum. In such a way, the base station can appropriately control interference to itself or to other parties over the shared spectrum to avoid such interference as destroying spectrum sharing appearing over the shared spectrum.

The previous description of the disclosure is provided to enable any person of ordinary skill in the art to make or use the disclosure. Various modifications to the disclosure will be readily apparent to those of ordinary skill in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein. Although such modifications and replacements are not fully disclosed in the previous description, they have been substantially covered in the following claims as appended.

What is claimed is:

1. A base station of an operator in a spectrum sharing system, comprising:
   a sensor, configured to sense signals over a shared spectrum;
   a transceiver, configured to receive at least one measurement report transmitted from at least one user terminal regarding signals over the shared spectrum sensed by the at least one user terminal; and
   a processor, connected with the sensor and the transceiver and configured to determine whether to utilize the shared spectrum according to the signals over the shared spectrum sensed by the sensor or acquired from the at least one measurement report;
   wherein the processor is further configured to:
   determine whether the signals over the shared spectrum include signals of other operators;

compare energy of the signals over the shared spectrum with a first threshold and a second threshold being larger than the first threshold as determining that the signals over the shared spectrum include signals of the other operators; and enable the operator to negotiate with the other operators for usage of the shared spectrum, if the energy of the signals over the shared spectrum is larger than the first threshold but smaller than the second threshold.

2. The base station as claimed in claim 1, wherein the base station and at least one user terminal controlled by the base station have operated on the shared spectrum and the processor is further configured to:

enable the base station and the at least one user terminal controlled by the base station to continue to utilize the shared spectrum, if the energy of the signals over the shared spectrum is smaller than the first threshold; and enable the base station and the at least one user terminal controlled by the base station to evacuate from the shared spectrum, if the energy of the signals over the shared spectrum is larger than the second threshold.

3. The base station as claimed in claim 2, wherein the processor is further configured to:

determine whether the signals over the shared spectrum include other decodable signals which are not generated by the base station or the at least one user terminal controlled by the base station, before enabling the operator to negotiate with the other operators;

enable the operator to negotiate with the other operators for usage of the shared spectrum, if the processor determines that the signals over the shared spectrum do not include the other decodable signals;

calculate an adjusted energy by deducting energy of the other decodable signals from the energy of the signals over the shared spectrum, if the processor determines that the signals over the shared spectrum includes the other decodable signals;

compare the adjusted energy with the first threshold and the second threshold;

enable the base station and the at least one user terminal controlled by the base station to continue to utilize the shared spectrum, if the adjusted energy is smaller than the first threshold;

enable the operator to negotiate with the other operators for usage of the shared spectrum, if the adjusted energy is larger than the first threshold but smaller than the second threshold; and enable the base station and the at least one user terminal controlled by the base station to evacuate from the shared spectrum, if the adjusted energy is larger than the second threshold.

4. The base station as claimed in claim 3, wherein the other decodable signals are generated by other base stations or user terminals owned by the operator or the other operators.

5. The base station as claimed in claim 1, wherein the base station and at least one user terminal controlled by the base station have not operated on the shared spectrum and the processor is further configured to:

enable the base station and the at least one user terminal controlled by the base station to operate on the shared spectrum, if the energy of the signals over the shared spectrum is smaller than the first threshold; and enable the base station and the at least one user terminal controlled by the base station to refrain from operating on the shared spectrum, if the energy of the signals over the shared spectrum is larger than the second threshold.

6. The base station as claimed in claim 5, wherein the processor is further configured to:

determine whether the signals over the shared spectrum include other decodable signals which are not generated by the base station or the at least one user terminal controlled by the base station, before enabling the operator to negotiate with the other operators;

enable the operator to negotiate with the other operators for usage of the shared spectrum, if the processor determines that the signals over the shared spectrum do not include the other decodable signals;

calculate an adjusted energy by deducting energy of the other decodable signals from the energy of the signals over the shared spectrum, if the processor determines that the signals over the shared spectrum includes the other decodable signals;

compare the adjusted energy with the first threshold and the second threshold;

enable the base station and the at least one user terminal controlled by the base station to operate on the shared spectrum, if the adjusted energy is smaller than the first threshold;

enable the operator to negotiate with the other operators for usage of the shared spectrum, if the adjusted energy is larger than the first threshold but smaller than the second threshold; and enable the base station and the at least one user terminal controlled by the base station to refrain from operating on the shared spectrum, if the adjusted energy is larger than the second threshold.

7. The base station as claimed in claim 6, wherein the other decodable signals are generated by other base stations or user terminals owned by the operator or the other operators.

8. A method for determining usage of a shared spectrum in a spectrum sharing system, comprising:

sensing signals over a shared spectrum or receiving at least one measurement report transmitted from at least one user terminal regarding signals over the shared spectrum sensed by the at least one user terminal, by a base station owned by an operator;

determining whether to utilize the shared spectrum according to the signals over the shared spectrum by the base station;

determining whether the signals over the shared spectrum include signals of other operators by the base station;

comparing energy of the signals over the shared spectrum with a first threshold and a second threshold being larger than the first threshold by the base station as determining that the signals over the shared spectrum include signals of the other operators; and enabling the operator to negotiate with the other operators for usage of the shared spectrum by the base station, if the energy of the signals over the shared spectrum is larger than the first threshold but smaller than the second threshold.

9. The method as claimed in claim 8, wherein the base station and at least one user terminal controlled by the base station have operated on the shared spectrum and the method further comprising the following steps performed by the base station:

enabling the base station and the at least one user terminal controlled by the base station to continue to utilize the shared spectrum, if the energy of the signals over the shared spectrum is smaller than the first threshold; and enabling the base station and the at least one user terminal controlled by the base station to evacuate from the shared spectrum, if the energy of the signals over the shared spectrum is larger than the second threshold.

10. The method as claimed in claim 9, further comprising the following steps performed by the base station:
   determining whether the signals over the shared spectrum include other decodable signals which are not generated by the base station or the at least one user terminal controlled by the base station, before enabling the operator to negotiate with the other operators;
   enabling the operator to negotiate with the other operators for usage of the shared spectrum, if the base station determines that the signals over the shared spectrum do not include the other decodable signals;
   calculating an adjusted energy by deducting energy of the other decodable signals from the energy of the signals over the shared spectrum, if the base station determines that the signals over the shared spectrum includes the other decodable signals;
   comparing the adjusted energy with the first threshold and the second threshold;
   enabling the base station and the at least one user terminal controlled by the base station to continue to utilize the shared spectrum, if the adjusted energy is smaller than the first threshold;
   enabling the operator to negotiate with the other operators for usage of the shared spectrum, if the adjusted energy is larger than the first threshold but smaller than the second threshold; and
   enabling the base station and the at least one user terminal controlled by the base station to evacuate from the shared spectrum, if the adjusted energy is larger than the second threshold.

11. The method as claimed in claim 10, wherein the other decodable signals are generated by other base stations or user terminals owned by the operator or the other operators.

12. The method as claimed in claim 8, wherein the base station and at least one user terminal controlled by the base station have not operated on the shared spectrum and the method further comprising the following steps performed by the base station:
   enabling the base station and the at least one user terminal controlled by the base station to operate on the shared spectrum, if the energy of the signals over the shared spectrum is smaller than the first threshold; and
   enabling the base station and the at least one user terminal controlled by the base station to refrain from operating on the shared spectrum, if the energy of the signals over the shared spectrum is larger than the second threshold.

13. The method as claimed in claim 12, further comprising the following steps performed by the base station:
   determining whether the signals over the shared spectrum include other decodable signals which are not generated by the base station or the at least one user terminal controlled by the base station, before enabling the operator to negotiate with the other operators;
   enabling the operator to negotiate with the other operators for usage of the shared spectrum, if the base station determines that the signals over the shared spectrum do not include the other decodable signals;
   calculating an adjusted energy by deducting energy of the other decodable signals from the energy of the signals over the shared spectrum, if the base station determines that the signals over the shared spectrum includes the other decodable signals;
   comparing the adjusted energy with the first threshold and the second threshold;
   enabling the base station and the at least one user terminal controlled by the base station to operate on the shared spectrum, if the adjusted energy is smaller than the first threshold;
   enabling the operator to negotiate with the other operators for usage of the shared spectrum, if the adjusted energy is larger than the first threshold but smaller than the second threshold; and
   enabling the base station and the at least one user terminal controlled by the base station to refrain from operating on the shared spectrum, if the adjusted energy is larger than the second threshold.

14. The method as claimed in claim 13, wherein the other decodable signals are generated by other base stations or user terminals owned by the operator or the other operators.

* * * * *